United States Patent
Morrison et al.

(10) Patent No.: US 7,203,291 B2
(45) Date of Patent: Apr. 10, 2007

(54) APPARATUS AND METHOD FOR GENERATING CALL INFORMATION DATA FOR CALLS ON LONG DURATION

(75) Inventors: Suzanne Morrison, Edinburgh (GB); Neil Mckenzie, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 521 days.

(21) Appl. No.: 10/858,460

(22) Filed: Jun. 1, 2004

(65) Prior Publication Data

US 2005/0276400 A1 Dec. 15, 2005

(51) Int. Cl.
*H04M 15/00* (2006.01)
(52) U.S. Cl. .................. 379/126; 379/111; 379/112.01; 379/112.08; 379/114.14
(58) Field of Classification Search ................ 379/111, 379/112.01, 112.04, 112.08, 114.01, 114.04, 379/114.08–114.09, 114.14, 114.28, 115.01, 379/118, 121.04, 126, 133–138
See application file for complete search history.

(56) References Cited

U.S. PATENT DOCUMENTS

| | | | | | |
|---|---|---|---|---|---|
| 5,712,908 | A | * | 1/1998 | Brinkman et al. | 379/114.28 |
| 6,614,781 | B1 | * | 9/2003 | Elliott et al. | 370/352 |
| 2004/0064351 | A1 | * | 4/2004 | Mikurak | 705/7 |
| 2004/0114741 | A1 | * | 6/2004 | Ngo et al. | 379/133 |

* cited by examiner

Primary Examiner—Binh K. Tieu

(57) ABSTRACT

An apparatus for generating data for long duration calls includes: call sensors distributed across a network for detecting call messages, correlating call messages relating to a call, and for storing call message related information, including at least one of the call network endpoints in an at least partial correlated call record; a time detection module for determining which network endpoints are located in a time standard that has just passed, or is about to pass, a predetermined time; and a call record controller for providing a control signal instructing at least some call sensors to determine whether any correlated call records relate to a call that includes one of the determined network endpoints and that started more than a predetermined time period prior to the predetermined time. The call sensors generate and transmit for storage an interim call data record (CDR) for each of the determined correlated call records.

18 Claims, 3 Drawing Sheets

APPARATUS AND METHOD FOR GENERATING CALL INFORMATION DATA FOR CALLS ON LONG DURATION

BACKGROUND OF THE INVENTION

1. Field of the Invention

This invention relates to an apparatus and method for generating call information data for calls of long duration from a telephone network, particularly, though not exclusively, to an apparatus and method for generating call information data for calls of long duration from a telephone network having out-of-band signalling.

2. Brief Description of Related Developments

In modern switched telecommunications systems (in particular, modern PSTNs) it has become common practice to provide two related but separate network infrastructures: a bearer or transmission network for carrying end-user voice and data traffic, and a signalling network for controlling the setup and release of bearer channels through the bearer network in accordance with control signals transferred through the signalling network (sometimes known as out-of-band signalling). In practice, such signalling networks comprise high-speed computers interconnected by signalling links; computer programs control the computers to provide a set of operational and signalling functions in accordance with a standardised protocol. One example of such a signalling protocol is the Signalling System No. 7 (SS7), whether as specified by the CCITT, ANSI, ETSI (for GSM), Bellcore or similar body, such as a network being herein referred to as an SS7 network. SS7 networks are extensively deployed for control of telephone and other data transmission networks and basically comprise various types of signalling points, namely, Signalling End Points (SEPs), for example an end office or local exchange, and Signalling Transfer Points (STPs) interconnected by signalling links, the SEPs being associated for example with respective Signalling Switching Points (SSPs) of the transmission network, and with Signalling Control Points (SCPs).

In SS7 networks, signalling information is passed over the signalling links. In particular, the signalling information is used by a CDR Builder to generate a Call Detail Record (CDR) which can later be analysed. For example, the CDRs can be analysed by reference to a particular customer of a telecommunications company (telco) operating the SS7 system, or certain types of data can be mined from Call Detail Records maintained by telcos in databases, including, for example, billing databases.

The CDRs may be generated by an apparatus, such as the product developed by Agilent Technologies and known as "acceSS7". This apparatus consists of a CDR Builder, a CDR Agent and a Data Management Component (DMC). The CDR Builder monitors the signaling channels of the SS7 network and generates the CDRs, which are then passed via the CDR Agent to the DMC, where they are processed and correlated to provide a database of the records that can be viewed by interested parties, for example, telcos. In some systems, some processing of the data (Interconnect Analysis) can take place prior to the CDRs being stored in the DMC, for example, the CDRs can be analysed to categorise the calls in various ways so that database has enhanced information regarding the calls. An interface is provided to the databases so that the telcos can carry out various processing and analysis functions, for example, checking billing, checking that data is transferred correctly, checking for quality of service, etc.

One function that the telcos often carry out is to correlate and check groupings and totals CDRs (as may be provided by the Interconnect Analysis) with their own records of calls generated, for example, by switches in the telecommunications network. However such processing, analysis or comparison with other types of data record, can be complicated by differences in the methods of generating the different call records. In particular, problems can arise when trying to correlate call records for long duration calls that last for more than 24 hours (often lasting several days). Such long duration calls are becoming more and more frequent, especially in territories where some types of calls are very cheaply priced, or free, or more especially, where there is a flat rate charge per call, in which case it is cheaper to stay connected, for example for an internet or other data connection, than it is to disconnect and reconnect. One problem that can occur with such long duration calls is that call records that telcos may have will provide data for all calls over a particular day, even if the call has not been completed, whereas the acceSS7 apparatus only generates a CDR when a call is actually completed. Therefore, if a call lasts several days, the CDR will be generated at the completion of the call and cannot easily be correlated with the call records relating to that call generated daily and used by the telco to compare records and check billing. The main problem is that a telco has no easy way to verify that a usage figure given to it by another operator is correct. The need is to ensure that the other operator is using the amount of time that they say they are. At the moment it is hard to verify this due to the reasons mentioned above.

BRIEF SUMMARY OF THE INVENTION

In a first aspect, the invention provides an apparatus for generating call information data for calls of long duration occurring between an originating network endpoint and a destination network endpoint, the apparatus comprising: a plurality of call sensors distributed across a telecommunications network for detecting call messages, correlating call messages relating to the same call and for storing information, relating to those call messages, including at least one of the network endpoints for the call, in an at least partial correlated call record; a time detection module for determining which network endpoints are located in a time standard that has just passed, or is about to pass, a predetermined time; a call record controller for providing a control signal instructing the call sensors to determine whether any of the correlated call records relate to a call that includes one of the determined network endpoints and that started more than a predetermined time period prior to the predetermined time; wherein the call sensors generate an interim call data record (CDR) for each of the determined correlated call records and transmit the interim CDR for storage.

In one embodiment, the call sensors mark the correlated call records with an indication that an interim CDR based on the correlated call record has previously been generated.

An interim CDR can be marked to indicate its order in a sequence of interim CDRs relating to the same correlated call record.

The apparatus may further comprise a CDR combiner for combining all interim CDRs received from different call sensors relating to the same call into a single interim CDR transmitted for storage.

The call record controller may comprise a table having information correlating the network endpoints with the time standards in which they are located.

The call sensors may transmit the interim CDRs at a controlled rate.

The predetermined time may be midnight and the predetermined time period may be 24 hours.

The call sensors may generate a partial call data record (CDR) for each correlated call record on completion of that call and transmit the partial CDR, and the apparatus may further comprise a CDR combiner for combining the partial CDRs into a complete CDR relating to a particular completed call.

According to a second aspect, the invention provides a method of generating call information data for calls of long duration occurring between an originating network endpoint and a destination network endpoint in an apparatus having a plurality of call sensors distributed across a telecommunications network for detecting call messages, correlating call messages relating to the same call and for storing information relating to those call messages, including at least one of the network endpoints for the call, in an at least partial correlated call record, the method comprising the steps of: determining which network endpoints are located in a time standard that has just passed, or is about to pass, a predetermined time; instructing the call sensors to determine whether any of the correlated call records relate to a call includes one of the determined network endpoints and that that started more than a predetermined time period prior to the predetermined time; the call sensors generating an interim call data record (CDR) for each of the determined correlated call records and transmitting the interim CDR for storage.

The method may further comprise the step of marking the correlated call records with an indication that an interim CDR based on the correlated call record has previously been generated.

An interim CDR may be marked to indicate its order in a sequence of interim CDRs relating to the same correlated call record.

The method may further comprise the step of combining all interim CDRs relating to the same call into a single interim CDR.

The method may further comprise the step of maintaining a table in which the network endpoints are correlated with the time standards in which they are located.

The rate at which the partial CDRs are transmitted may be controlled.

The predetermined time may be midnight and the predetermined time period may be 24 hours.

The method may further comprise the steps of generating a partial call data record (CDR) for each correlated call record on completion of that call, transmitting the partial CDR, and combining the partial CDRs into a complete CDR relating to a particular completed call.

BRIEF DESCRIPTION OF THE DRAWINGS

One embodiment of the invention will now be more fully described, by way of example, with reference to the drawings, of which.

DETAILED DESCRIPTION OF THE PREFERRED EMBODIMENT(S)

Figure 1:
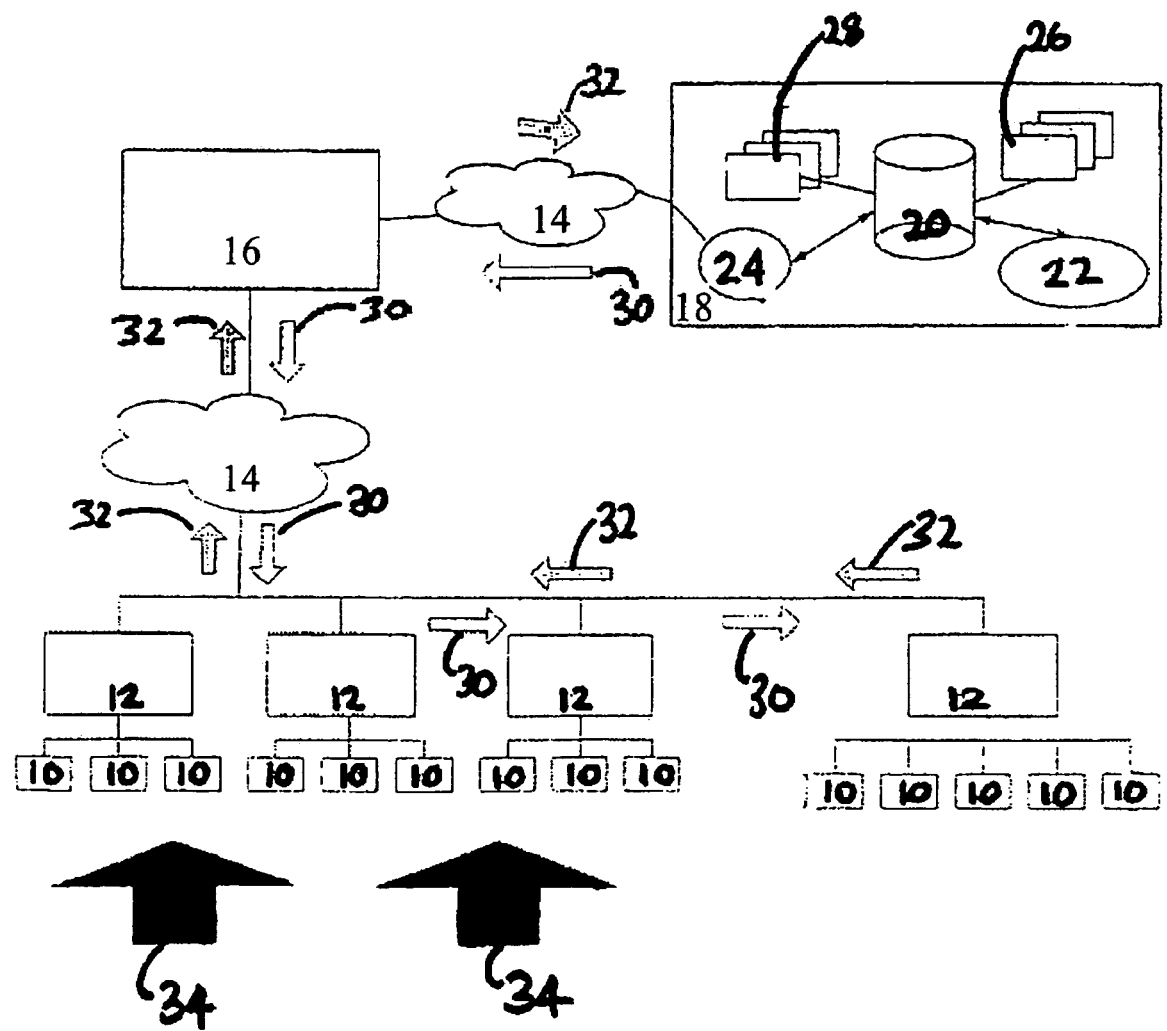
FIG. 1 shows a block diagram of a system incorporating the apparatus according to one embodiment of the present invention.

FIG. 1 schematically illustrates the architecture of a system that can be used by a telco, to monitor a telecommunications network using SS7 signaling technology, in which it is envisaged the invention may be utilized. It will be appreciated by those skilled in the art that the invention could be worked in other communications networks utilizing signaling systems other than SS7.

FIG. 1 shows a plurality of CDR building probes (10), which monitor links in the SS7 network. Numerous CDR building probes (10) may be distributed across the network, each CDR building probe (10) being connected to a Site processor (12). There may be numerous Site processors in the network, each having several CDR building probes (10) connected thereto. Each of the Site processors (12) is connected to a central server (16), for example an acceSS7 central server (16). The connection between Site processor (12) and central server (16) is shown in FIG. 1 across a Wide Area Network (WAN) (14), although other alternatives known in the art could be used. Indeed there may be more than one level of Site processor (12), such that a higher level Site processor (12) collects from several lower level Site processors (12), ultimately terminating with the central server (16); or the CDR building probes (10) may transmit directly to the central server (16). The central server (16) is connected to a database server (18) again across a WAN (14), although alternatives are envisaged where the database server (18) runs on the central server (16) or across other connection types. Alternatively, the Site processors (12) could be connected directly to the database server (18) across a WAN. The database server (18) holds a database (20) which stores data which may include reference data (28) and CDR tables (26) and runs processes or applications such as Interconnect analysis (22) and a process termed a Midnight Detection Process (MDP) (24) described in more detail hereinafter.

Call related messages travel across the telecommunications network as Message Signal Units MSU (34) and are monitored by the CDR building probes (10). When a new call is initiated in an SS7 system, an Initial Address Message (IAM) is sent across the network from the call origin to its destination. On detection of an IAM, the CDR building probe (10) that detects the IAM creates a record containing information from the IAM message in a database located at the CDR building probe (10). Every call on the network can be uniquely identified by three data fields contained within a Message Signal Unit (MSU). These three fields are an Originating Point Code (OPC), a Destination Point Code (DPC) and a Circuit Identification Code (CIC). A point code is a unique identifier, sometimes called the 'address' of a piece of network equipment. The address typically may take the form of an ANSI point code, a 24 bit number in three octets, where an octet is an 8 bit number which can take the decimal values 0 to 255. The point code in decimal form appears as, XXX.XXX.XXX, where XXX signifies an octet each octet comprising a named network, cluster and member respectively.

These three data fields are used to index the CDR (32) in the memory of the CDR building probe (10). The database may take the form of a hash table as is known in the art. A Hash table is commonly used because it facilitates fast retrieval of data. Another feature of a hash table is the way in which it can index data according to its content, such that when data of the same content, for example data with the same OPC, DPC, CIC, is detected, it can be correlated to the same record in the hash table.

When the CDR building probe (10) detects another MSU, it checks the data fields to determine whether the MSU relates to a call for which a record already exists in its hash table. If so, the information from that new MSU relating to the particular call is stored in the same record in the hash table. In this way all data relating to a single call detected by an individual probe is stored in the same record in the hash table at the CDR building probe (10).

MSU's for a single individual call may follow different signal paths in the network, thereby passing through different network equipment, such as switches. This feature of SS7 systems allows redundancy which is useful, for example if a particular route is busy or faulty. However, this means that MSUs relating to the same call may pass through different parts of the network and therefore be detected by different CDR building probes (10). In order to accommodate this redundancy in the SS7 system, when a CDR building probe (10) detects an IAM, that CDR building probe (10) sends a message to other appropriate CDR building probes (10) that could possibly be in the signalling path for that call to instruct them to create a record for the call in their respective hash tables. These records will be indexed according to the same rules using the same data so that any of those CDR building probes (10) that later detect an MSU for that call will correlate the information to the same record within the respective hash table. This allows a record of all MSU's relating to a single call to be monitored irrespective of the path they follow. Provided that a sufficient number of CDR building probes (10) are employed within the telecommunications network, all MSU's of all calls on the network can be monitored and recorded.

Upon termination of a call in an SS7 system, a Release Complete Message (RLC) is transmitted. The CDR building probe (10) which detects the RLC will then send out a message to the other appropriate CDR building probes (10) in the group that could possibly be storing a record for that call instructing them that the call has terminated. At this point, all the CDR building probes (10) that have a record for that call that includes any MSU information generate a partial CDR for the call and send the partial CDR to the Site processor (12), which runs a CDR correlation process. The hash tables of the CDR building probes (10) are then cleared of the record. It will be apparent, of course, that not all the CDR building probes (10) having the record will have MSU data relating to the call since they may not have detected any MSUs relating to the call. In this case, no partial CDR is generated and the details of the record are deleted from the hash table, being no longer required as the call has been completed.

The partial CDR sent by the CDR building probes is 'partial' in that each individual one may not contain all the information about the call. At the site processor (12) the partial CDRs are collated together into a single complete CDR (32) containing information regarding all the MSU's relating to the call in question. Complete CDRs (32) are then sent to the central server (16). The complete CDRs travel over the Wide Area Network (WAN) (14) to the database server (18) where they are appropriately stored so that the information may be used to undergo a variety of possible types of analysis, such as an interconnect analysis application (22) known in the art. As mentioned above, the type of analysis of present interest is a comparison with data generated by the switching equipment that forms part of the telecommunications network. This may be especially pertinent when the data used for comparison has come from an external source beyond the control of the telco monitoring the telecommunications network.

Typically switch based call records comprise basic call information, whilst the CDRs (32) of the SS7 system may comprise enriched data in addition to the basic call information. When the methods of recording the transmission data differ, it can become difficult, expensive and time consuming to carry out this comparison. A process commonly known as "Stare and Compare" is sometimes used to perform this task, which must be done manually due to the apparent anomalies in the data. Commonly, however, the operators will look at reports based on summarized data, e.g. in the case of interconnect Analysis, Minutes of Use totals across different carriers. Discrepancies can then be investigated using Stare and Compare. A typical anomaly would occur when call durations are long. As mentioned above, the switching equipment of a telecommunications network will usually generate daily call records for a single long duration call, whilst the SS7 system generates a single CDR (32) for each call upon termination of a call of any duration. Although by long duration call it is usually expected meant one exceeding 24 hours, it will be appreciated that the it need not be so limited and could refer to any configurable call duration.

The nature of the anomaly with long call duration records is that the data compiled by switching equipment shows the minutes of use for any given day, listing data for all those calls that have terminated and any calls in progress exceeding 24 hrs, whilst the data recorded using SS7 equipment will not show data for any call in progress, therefore the two records for that day may vary considerably. In the case where one telco utilizes the services and resources of another, lengthy disputes can occur when trying to establish minutes of use data for billing purposes, thereby delaying payment and leading to capital resources being tied up until the dispute is resolved. The disputes may be further complicated by determination of minutes of use when different call charge rates exist for calls of different types, for example local, intraLATA, interLATA.

Typically, the network systems (such as switching equipment), run on the local time standard where the equipment resides, in contrast to the SS7 system equipment, which is all referenced to the UTC time standard. Typically, a switch at an end office generates information such as the daily minutes of use of that switch at or about midnight local time. Since it is possible that somewhere the local time of equipment of interest to the telco, has passed, or is about to pass, midnight, it is desirable to know when this occurs.

Thus, the database server (18) runs the Midnight Detection Process (MDP) (24) to determine which of the Destination Point Codes (DPC)) (or, alternatively, Originating Point Codes (OPC)) are located in a time zone or, at least, are operating on a time standard, which has passed, or is close to, midnight. Of course alternative embodiments may make this determination referenced to any selected time of day. The process requires knowledge of the Point Codes of the network equipment and the time standard which the equipment is running, normally the time standard of the time zone is which it is resident. In the case of a long distance call carrier, such as those that operate in the US, then the list of Point Codes may simply be a list of all the end offices (switches) of the local exchange carrier (LEC) to which its network transfers calls. Thus the database server (18) stores 'Point Code to Time zone mapping' in a table as a record of the Point Codes and their respective time zones.

The Midnight Detection Process (24) firstly checks the current time on the database server (18); this is normally local time. Timestamping in the acceSS7 system is in UTC time. The timezone of the machine that the Midnight Detection Process runs is irrelevant to the task it is performing (as long as it knows what the timezone of the machine is). It uses the timezone of the machine to work out when midnight in other timezones will be reached, but it doesn't have to be any specific timezone.

Figure 2:
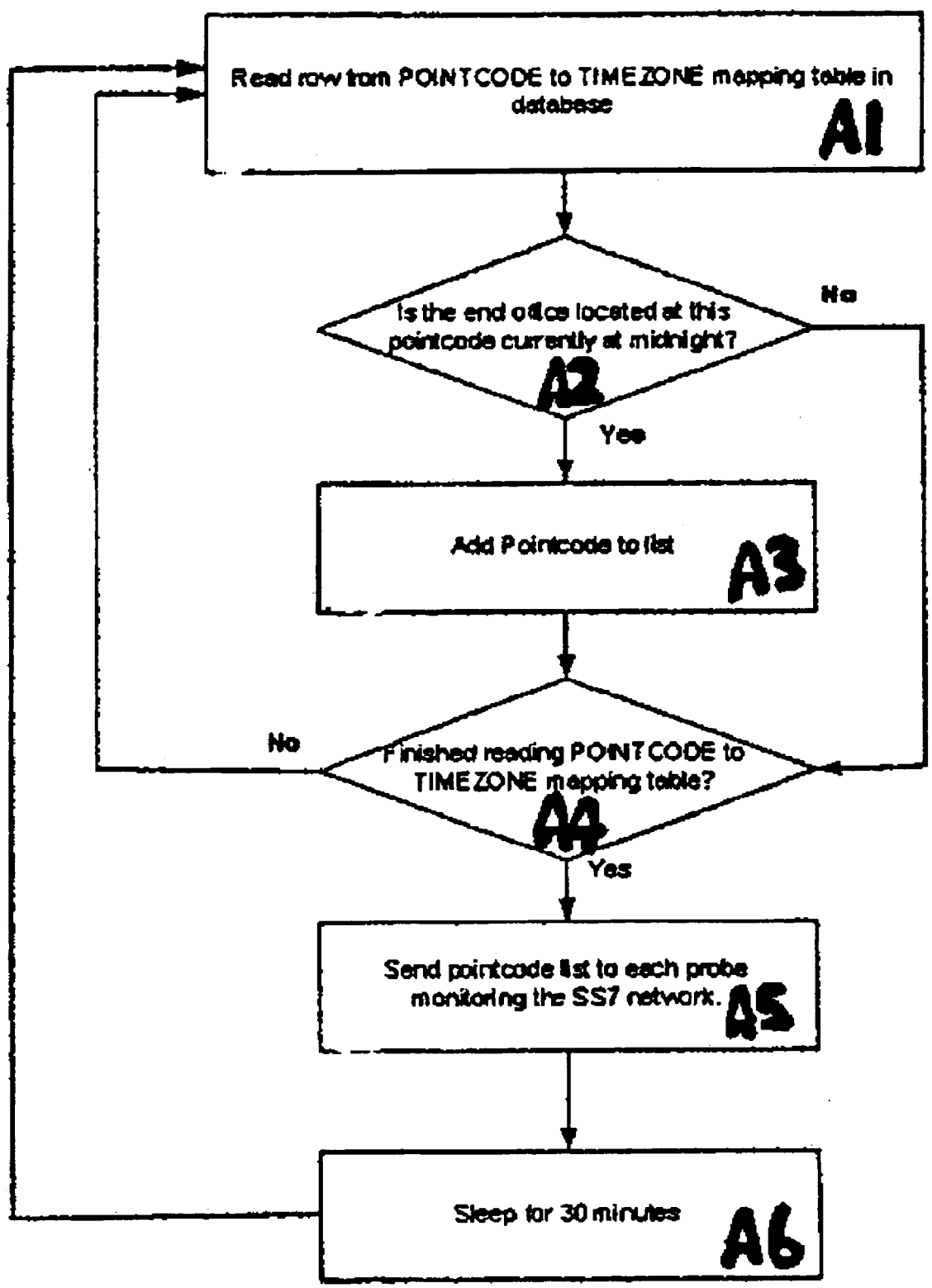
FIG. 2 shows a schematic flow chart of the operation of a first process carried out by the apparatus shown in FIG. 1.

The process then lies dormant until a specified and configurable time is reached or time interval has passed. This may be upon reaching a half hour boundary, for example zero or 30 minutes past the hour, at which time the process steps of FIG. 2 are executed. These process steps will now be more fully described with reference to the step reference numerals of FIG. 2:

A1 This step is executed upon reaching the first half hour boundary after startup of the process. This step is also executed automatically after step A6 has been executed or upon a negative result from step A4. In this step, information from the Point Code to Time zone mapping table is read from the database held by the database server (18). Step A2 is then automatically executed following execution of this step.

A2 This step is carried out when step A1 has been executed. A determination is made whether or not the Point Code read in step A1 identifies equipment whose local operating time has reached, or is about to reach, midnight. If the result returned is that the Point Code has not reached midnight, then the process moves to step A4. If the result is that the Point Code has reached, or is about to reach, midnight, then step A3 is executed.

A3 This step is carried out when a positive result is returned on execution of step A2. The Point Code read from the Point Code to Time zone mapping table in step A1 is added to a list, which will be termed a "midnight detected list" hereinafter. Step A4 is automatically executed following execution of this step.

A4 This step is carried out when step A3 has been executed, or when a negative result is returned on execution of step A2. A check is made to determine if steps A1 to A3 have been executed for all the Point Codes in the Point Code to Time zone mapping table, for this particular execution of the Midnight Detection Process (24). If the result returned is negative, that all Point Codes have not been read, then the process returns to step A1, where the next Point Code is read. If the result returned is positive, that all Point Codes have been read, then step A5 is executed.

A5 This step is carried out when a positive result is returned on execution of step A4. The "midnight detected list" is then sent to each CDR building probe (10) monitoring the SS7 network. This data is sent in the form of a Midnight Detection Message (MDM) (30), as shown in FIG. 1, in which one of the data fields of the message is the "midnight detected list". Step A6 is automatically executed following execution of this step.

A6 This step is carried out when step A5 has been executed. The process is made dormant for 30 minutes, at which time the process returns to start again by execution of step A1.

It will be appreciated that the steps of this process could be executed on the database server (18) or upon another piece of equipment with access to the Point Code to Time zone mapping table, which could be stored on a different piece of equipment, if desired.

Figure 3:
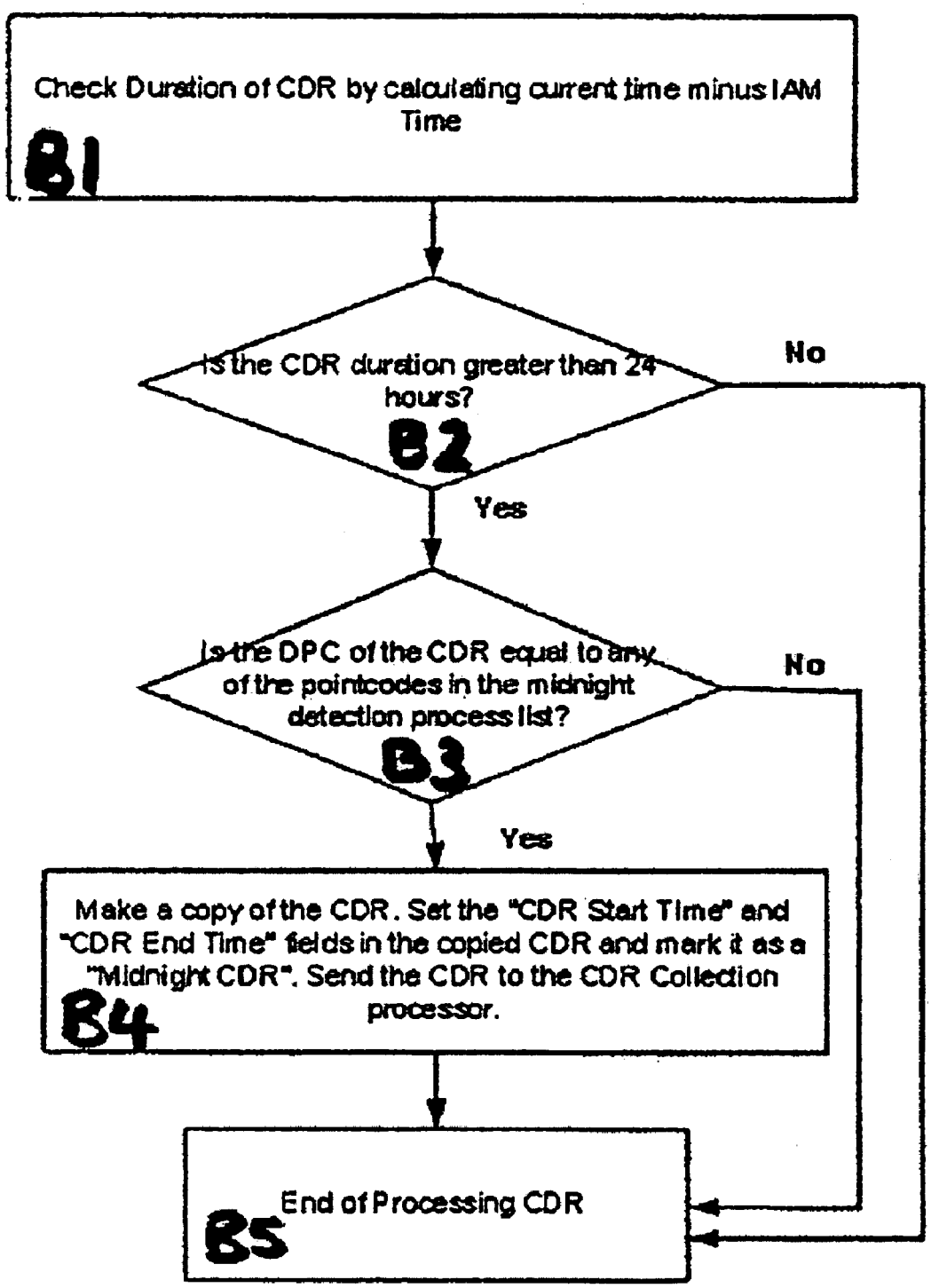
FIG. 3 shows schematically a second process carried out by the apparatus of FIG. 1.

FIG. 3 shows the steps of a "Midnight CDR Search and Dispatch" process carried out by each of the CDR building probes (10) upon receipt of an MDM (30) from the Midnight detection process (24) of the database server (18). As explained above, the MDM (30) contains the "midnight detected list" of Point Codes.

The function of the "Midnight CDR Search and Dispatch" process is to generate an interim CDR from the list of records held by the CDR building probe (10) in its hash table, for a call exceeding 24 hours duration and still in progress, and send it to a central collection point. To facilitate the function of the "Midnight CDR Search and Dispatch" process, two new data fields may be added to the call records being stored in the hash table. These two data fields are a "CDR Start Time" and a "CDR End Time", which allow tracking of interim CDRs, and aid in determining that time period for which an interim CDR has already been received. Depending on the desired operation of the system, the interim CDRs may be cumulative, i.e. they contain all previously sent information plus any new information received in the period for which it has been recording, or they may be independent, i.e. only new information is included, although, of course, they need to contain enough information to be of use to an application. After the IAM, ACM and ANM messages have been detected, there is generally no other messages until the REL/RLC, which could be hours or days later. The "CDR Start Time" indicates the time from which new information is contained with in the record. The "CDR End Time" indicates the time at which the Interim CDR is compiled and sent to the central collection point, which may be the database server (18).

The CDR building probes (10) execute the steps of the "Midnight CDR Search and Dispatch" process as described below:

B1 This step is executed upon receipt of a MDM (30). A calculation of the duration of a first call record in the hash table is made to determine the duration that the respective call has been in progress. This is done by calculating the current time and subtracting the IAM time, which is the time the IAM was transmitted. Step B2 is automatically executed following execution of this step.

B2 This step is automatically executed following execution of step B1. A computation is made to determine if the duration of the call record is greater than 24 hours. If a negative result is returned, that the duration is shorter than 24 hours, then step B5 is executed; if a positive result, that the duration is longer than 24 hours, is returned, then step B3 is executed.

B3 This step is executed upon return of a positive result from step B2. The Destination Point Code (DPC) of the call record is then checked against the list of Point Codes received from the MDM (30) which triggered the "Midnight CDR Search and Dispatch" process. If the DPC of the record in the hash table matches any of those in the list, a positive result is returned and step B4 is executed. If the DPC does not match any of those in the list then a negative result is returned and step B5 is executed.

B4 This step is executed upon return of a positive result from step B3. A copy of the call record stored in the hash table is made. This copy is an interim CDR indicating that it is for a call which was still in progress at the time the "Midnight CDR Search and Dispatch" process was carried out. This interim CDR will be known hereinafter as a "Midnight CDR" since this is substantially the reference point in time for which the duration of the call was determined. The data fields "CDR Start Time" and "CDR End Time" are then assigned values. The "CDR Start Time" is given the value of the previous interim "CDR End Time", unless no previous interim CDR exists, in which case the "CDR Start Time" value would be the initial value of the IAM time, i.e. the time when the call initiated. The "CDR End Time" is assigned the time at which the interim CDR is created. The interim CDR is then marked in such a way, such as by an identifier 'Midnight CDR', so that it can be identified as an interim CDR to distinguish it from a complete CDR (32) generated in respect of a call that has terminated in the usual way. The interim CDR is then sent to the CDR collection process running on the site processor (12). This step is automatically followed by step B5.

B5 This step follows step B4 or can follow on from a negative result from either of steps B2 or B3. An instruction is sent to cease processing on the CDR.

The process steps B1 to B5 are carried out on all the call records in the hash table of each CDR building probe (10) upon receipt of the MDM (30). Each CDR building probe (10) begins at the start of the hash table processing each call record in turn in its hash table. It will, of course, be appreciated that steps B2 and B3 can be performed in either order. Both the checks, i.e. that the duration of the call is longer than 24 hours and that the DPC of the record in the hash table matches any of those in the list needs to be made, but they can be made in any order.

Since the SS7 system is a real time system it is desirable for all the partial "Midnight CDRs" relating to the same call to arrive substantially together, typically within 12 seconds, at the site processor (12) from the CDR building probes (10) in order for all the partial Midnight CDRs to be collated together into a single Midnight CDR having the same CDR Start Time and CDR End Time. This is facilitated by including an instruction in the MDM (30) telling the CDR building probes (10) to wait a specified and configurable length of time, or "delay", before beginning processing the hash table of call records, such that each CDR building probe (10) executes the 'Midnight CDR Search and Dispatch' process at substantially the same time, thereby allowing for differences in the length of time between sending the MDM (30) from the database server (18) and receipt at the numerous CDR building probes (10), accounting for the size of the network and volume of traffic traveling upon it. Due to the nature of the hash table indexing herein described the 'partial' call records for the same call held on independent CDR building probes (10) are processed substantially together. This is further facilitated by specifying a configurable number, 'CDR processing rate', of 'partial' call records to be processed in a given time period, for example a second, by each CDR building probe (10). This has the effect of distributing the load on the CDR building probe's (10) resources and also distributing the load on the network by limiting the number of possible 'partial' 'Midnight CDRs' that could be transmitted by a CDR building probe (10) in a given time.

The time taken to complete an execution of the 'Midnight CDR Search and Dispatch' process upon all of the call records held in the hash table of a CDR building probe (10) can be calculated when the hash table size, CDR processing rate and delay are known. This means that the load on the network resources can be calculated to be spread out between over the time period between transmittal of consecutive MDMs (30) if so desired. It also means that the process can be set such that the process begins at some configurable time before midnight such that the process completes processing of the hash table on a CDR building probe (10) and sufficient time is allowed for receipt of these 'just before midnight CDR's' to be received by the collection processor and collated so that records are generated on the same day as the data to which they refer. This may be desirable for billing purposes.

It will be appreciated that the invention could be implemented on systems other than SS7 systems and that the time periods and reference times could be chosen to have any value desired.

A possible alternative would be the creation of a 'midnight detected list' which was sent only to that equipment which could have detected part of a call terminating at one of the Point Codes in the list. This may allow greater time for the CDR building probe (10) to process the hash table, by only receiving a MDM (30) when it monitors equipment with Point Codes on the midnight detected list. It will be appreciated that if the CDR building probe (10) were to monitor equipment within a single timezone that this effect could be significant. It may also reduce network traffic sending only the necessary amount of Midnight detected messages.

Elements of the invention could be implemented independently from each other, for example, if two systems of data recordal operated on the same time standards but the events which triggered data generation differed in a manner similar to those described above, then the 'Midnight CDR search and detection process' could be operated without the need for a Point Code to Time zone Mapping table, so that steps of the Midnight detection process (24) and 'Midnight CDR Search and detection process' could be omitted with out departing from scope of the invention.

It will be appreciated that although only one particular embodiment of the invention has been described in detail, various modifications and improvements can be made by a person skilled in the art without departing from the scope of the present invention.

What is claimed is:

1. An apparatus for generating call information data for calls of long duration occurring between an originating network endpoint and a destination network endpoint, the apparatus comprising:
   a plurality of call sensors distributed across a telecommunications network for detecting call messages, correlating call messages relating to the same call and for storing information, relating to those call messages, including at least one of the network endpoints for the call, in an at least partial correlated call record;
   a time detection module for determining which network endpoints are located in a time standard that has just passed, or is about to pass, a predetermined time;
   a call record controller for providing a control signal instructing at least some call sensors to determine whether any of the correlated call records relate to a call that includes one of the determined network endpoints and that started more than a predetermined time period prior to the predetermined time;
   wherein the call sensors generate an interim call data record (CDR) for each of the determined correlated call records and transmit the interim CDR for storage.

2. An apparatus according to claim 1, wherein the call sensors mark the correlated call records with an indication that an interim CDR based on the correlated call record has previously been generated.

3. An apparatus according to claim 2, wherein an interim CDR is marked to indicate its order in a sequence of interim CDRs relating to the same correlated call record.

4. An apparatus according to claim 1, further comprising a CDR combiner for combining all interim CDRs received from different call sensors relating to the same call into a single interim CDR transmitted for storage.

5. An apparatus according to claim 1, wherein the call record controller comprises a table having information correlating the network endpoints with the time standards in which they are located.

6. An apparatus according to claim 1, wherein the call sensors transmit the interim CDRs at a controlled rate.

7. An apparatus according to claim 1, wherein the predetermined time is midnight.

8. An apparatus according to claim 1, wherein the predetermined time period is 24 hours.

9. An apparatus according to claim 1, wherein the call sensors generate a partial call data record (CDR) for each correlated call record on completion of that call and transmit the partial CDR, the apparatus further comprising a CDR combiner for combining the partial CDRs into a complete CDR relating to a particular completed call.

10. A method of generating call information data for calls of long duration occurring between an originating network endpoint and a destination network endpoint in an apparatus having a plurality of call sensors distributed across a telecommunications network for detecting call messages, correlating call messages relating to the same call and for storing information relating to those call messages, including at least one of the network endpoints for the call, in an at least partial correlated call record, the method comprising the steps of:
  determining which network endpoints are located in a time standard that has just passed, or is about to pass, a predetermined time;
  instructing at least some of the call sensors to determine whether any of the correlated call records relate to a call includes one of the determined network endpoints and that that started more than a predetermined time period prior to the predetermined time;
  the call sensors generating an interim call data record (CDR) for each of the determined correlated call records and transmitting the interim CDR for storage.

11. A method according to claim 9, further comprising the step of marking the correlated call records with an indication that an interim CDR based on the correlated call record has previously been generated.

12. A method according to claim 11, further comprising the step of marking an interim CDR to indicate its order in a sequence of interim CDRs relating to the same correlated call record.

13. A method according to claim 9, further comprising the step of combining all interim CDRs relating to the same call into a single interim CDR.

14. A method according to claim 9, further comprising the step of maintaining a table in which the network endpoints are correlated with the time standards in which they are located.

15. A method according to claim 9, wherein the rate at which the partial CDRs are transmitted is controlled.

16. A method according to claim 9, wherein the predetermined time is midnight.

17. A method according to claim 9, wherein the predetermined time period is 24 hours.

18. A method according to claim 9, further comprising the steps of generating a partial call data record (CDR) for each correlated call record on completion of that call, transmitting the partial CDR, and combining the partial CDRs into a complete CDR relating to a particular completed call.

* * * * *

UNITED STATES PATENT AND TRADEMARK OFFICE
CERTIFICATE OF CORRECTION

PATENT NO.       : 7,203,291 B2
APPLICATION NO.  : 10/858460
DATED            : April 10, 2007
INVENTOR(S)      : Morrison et al.

Page 1 of 1

It is certified that error appears in the above-identified patent and that said Letters Patent is hereby corrected as shown below:

In Column 1, line 3, delete "ON" and insert -- OF --.

In Column 1, line 3, (Title), delete "ON" and insert -- OF --.

In Column 12, line 4, Claim 11, delete "claim 9," and insert -- claim 10, --, therefor In Column 12, line 13, Claim 13, delete "claim 9," and insert -- claim 10, -- therefor In Column 12, line 16, Claim 14, delete "claim 9," and insert -- claim 10, -- therefor In Column 12, line 21, Claim 15, delete "claim 9," and insert -- claim 10, -- therefor In Column 12 line 23, Claim 16, delete "claim 9," and insert -- claim 10, -- therefor In Column 12, line 26, Claim 17, delete "claim 9," and insert -- claim 10, -- therefor In Column 12, line 28, Claim 18, delete "claim 9," and insert -- claim 10, -- therefor Signed and Sealed this Fifth Day of June, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,203,291 B2 |
| APPLICATION NO. | : 10/858460 |
| DATED | : April 10, 2007 |
| INVENTOR(S) | : Morrison et al. |

Page 1 of 1

It is certified that error appears in the above-identified patent and that said Letters Patent is hereby corrected as shown below:

In column 11, line 33, in Claim 10, before "started" delete "that".

Signed and Sealed this

Eighteenth Day of September, 2007

JON W. DUDAS
*Director of the United States Patent and Trademark Office*